Feb. 7, 1950     E. M. MOFFATT     2,496,806
GAS TEMPERATURE PROBE OF THE THERMOCOUPLE TYPE
Filed Nov. 27, 1946
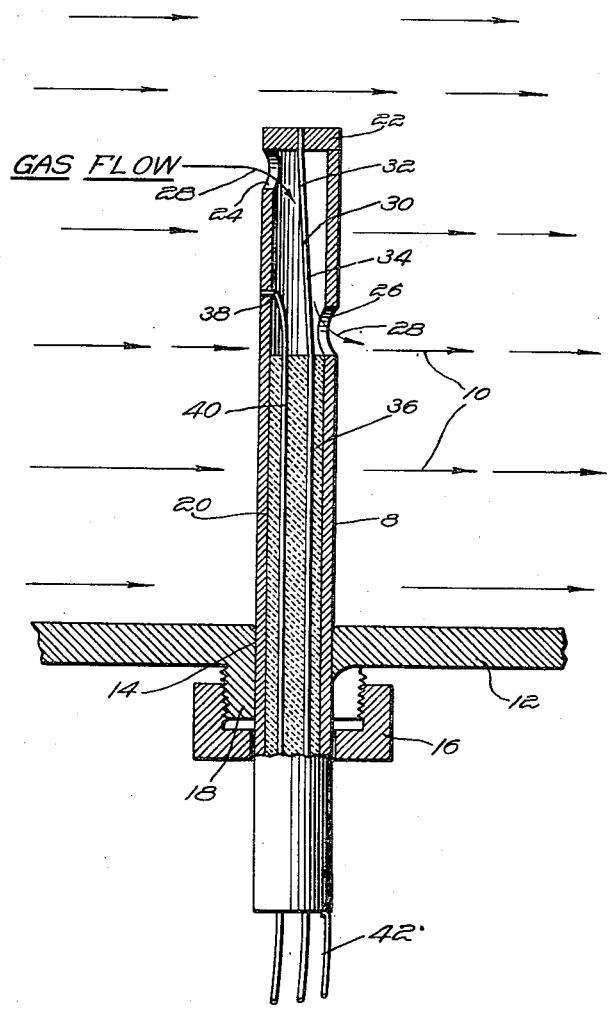
INVENTOR
Elbert Marston Moffatt
BY Charles A. Warren
ATTORNEY Patented Feb. 7, 1950

2,496,806

UNITED STATES PATENT OFFICE 2,496,806

GAS TEMPERATURE PROBE OF THE THERMOCOUPLE TYPE

Elbert Marston Moffatt, Glastonbury, Conn., assignor to United Aircraft Corporation, East Hartford, Conn., a corporation of Delaware Application November 27, 1946, Serial No. 712,527

7 Claims. (Cl. 136—4)

The invention relates to gas probes, particularly to a probe adapted for measuring the temperature of gas flowing through a duct.

When a thermocouple is placed in a conduit in which gas is flowing, the thermocouple junction loses heat by radiation to the walls of the duct so that the thermocouple does not indicate a true gas temperature. The thermocouple junction has been shielded to reduce radiation, although the shield is not entirely effective in all directions, since the shield must permit the flow of gas therethrough. The shield does not reach the true gas temperature since it radiates heat to the walls of the duct, and the thermocouple does not give a true indication of gas temperature since it still radiates heat to the shield. A feature of this invention is an arrangement for measuring the gas temperature more accurately than can be done with the usual shielded probe. Another feature is the arrangement of a probe which will give the temperature of a shielded thermocouple junction and also the temperature of the shield. From these temperatures it is then possible to obtain a true gas temperature.

A feature of the invention is a small gas probe of simple construction which will give accurate and dependable temperature indications and which will not seriously impede the flow of gas. Another feature is a probe of such a size that it may be made from relatively expensive and high heat resistant materials, such as platinum and/or platinum alloy and may thus be used for extremely high temperatures.

Shielded probes have depended upon reducing radiation errors to a minimum by shielding which, as a result, has been of a multi-ply construction necessarily making a bulky probe. A feature of this invention is to simplify the shieldings and to correct for radiation errors by measuring the shield temperature as well as the temperature of the main thermocouple junction in the gas path.

Other objects and advantages will be apparent from the specification and claims, and from the accompanying drawings which illustrate an embodiment of the invention.

The single figure is a sectional view through the probe in position in a duct.

The probe 8 is adapted for measuring the flow of gas, represented by the parallel arrows 10, in a duct 12, one wall only of which is shown. The probe 8 is adapted to be inserted through an opening 14 in the wall of the duct and may be held in place by a clamping nut 16 on the threaded boss 18 on the duct. The opening 14 may be relatively small in diameter by reason of the configuration of the probe as will hereinafter appear.

As shown, the probe 8 includes a shield or tube 20 of a suitable thermocouple alloy which by reason of the small size of the device may be platinum or one of the platinum alloys, if desired. At the inner end of the tube, which has a cap 22 of the same material, are provided axially spaced openings 24 and 26 to provide for a flow of air through the tube as represented by the arrows 28. These openings are on diametrically opposite sides of the tube so that the opening 24 may face into the gas stream and the opening 26 may face in the opposite direction for the discharge of the gas in the tube. The main thermocouple junction 30 is provided by a short wire 32, of the same material as the cap 22 and the tube 20, extending from the cap 22 which forms a part of the tube 20 and a wire 34 of another thermocouple alloy connected to the wire 32 and which, in conjunction with the other alloy, will provide an efficient thermocouple junction. The inner end of the tube thus acts as a shield for the main junction 30. The wire 34 extends through a ceramic core 36 which fills the tube 20 from the opening 26 to the outer end. Thus the thermocouple junction 30 is located in the path of the gas flowing through the tube and is effectively shielded in all directions so that the junction cannot radiate heat to the walls of the duct. As a result, this junction measures a gas temperature close to the true temperature.

In addition to the main junction 30 the probe may also be provided with a second junction 38 which is located in the tube 20, as by inserting the end of a wire 40 of a different thermocouple alloy than that of the tube 20 in an opening in the wall of the tube. The wire 40 is lead out through the ceramic core 36 in the same manner as the wire 34. It will be apparent that both wires 34 and 40 may be of the same material provided that they are a different material than that of the tube 20 and its cap 22.

It will be apparent that a probe of this type may be made extremely small in diameter so that only a small amount of material is required for the probe. Furthermore, since the tube may be extremely small, it requires only a small opening in the duct 12 and the tube does not seriously interfere with the flow of gas in the duct. Furthermore, the probe is extremely simple in construction and the arrangement is such that a wire 42 of the same material as the tube 20 and connected to the tube functions as one of the leads from both junctions 30 and 38.

By obtaining the approximate gas temperature as indicated by the thermocouple junction 30 and also the temperature of the shield by means of the junction 38, it is not difficult to obtain the true gas temperature. One means for obtaining this is by use of the formula:

$$T_s - T_p = \frac{h_r}{h_c}(T_p - T_r)$$

where $T_s$ = gas temperature
$T_p$ = temperature of main junction 30
$T_r$ = temperature of shield
$h_r$ = coefficient of heat transfer radiation
$h_c$ = coefficient of heat transfer by convection The values of $h_r$ and $h_c$ or their ratio may be determined by a calibration of the probe in a calibration chamber.

It is to be understood that the invention is not limited to the specific embodiment herein illustrated and described, but may be used in other ways without departure from its spirit as defined by the following claims.

I claim:

1. In a gas probe, a shield having openings which are diametrically opposed and axially spaced along the shield for the flow of a gas therethrough, the temperature of which gas is to be measured, a thermocouple having its junction located within the shield and in the path of gas flowing therethrough and a thermocouple wire of a different material from the shield connected thereto to form a thermocouple junction with the shield for measuring the shield temperature.

2. In a gas probe, a shield adapted to be positioned in a gas stream and made in part of a thermocouple alloy, a lead of another alloy connected to the shield to form a thermocouple junction thereon, said shield having openings which are diametrically opposed and axially spaced along the shield for the flow of a gas therethrough and a second thermocouple having its junction located within the shield in the path of the gas.

3. In a gas probe, a shield adapted to be positioned in a gas stream and made in part of a thermocouple alloy, a lead of another alloy connected to the shield to form a thermocouple junction thereon, said shield having openings which are diametrically opposed and axially spaced along the shield for the flow of a gas therethrough, and a second thermocouple including a short element of the same alloy as the shield connected thereto and extending into the path of the gas in the shield, and a lead of another alloy connected to said short element to form a thermocouple junction in the gas path.

4. In a gas probe, a shield in the form of a tube adapted to be positioned in a gas stream at right angles to the flow of the gas, said shield having in the walls thereof a single inlet opening and a single outlet opening, said openings being substantially diametrically opposed and axially spaced for the flow of gas through the shield, a cap on the end of the shield, and a thermocouple having its junction located substantially centrally of the shield and between the axially spaced openings.

5. In a gas probe, a shield in the form of a tube having substantially diametrically opposed axially spaced openings for the flow of gas through the shield, a cap on the end of the shield, and a thermocouple having its junction located substantially centrally of the shield and between the axially spaced openings, said thermocouple including a projecting element made of a thermocouple alloy connected to the shield and a wire of another thermocouple alloy connected to the element to form the junction.

6. In a gas probe, a shield in the form of a tube adapted to be positioned in a gas stream, said shield having a closed inner end, said shield also having axially spaced openings for the flow of gas through the shield, a thermocouple having its junction located within the shield and between the axially spaced openings, said thermocouple including a projection on the shield of one thermocouple alloy and a wire of another thermocouple alloy connected thereto with the connection of the wire and the projection forming the thermocouple junction.

7. In a gas probe, a shield in the form of a tube adapted to be positioned in a gas stream, said shield having a closed inner end, said shield also having axially spaced openings for the flow of gas through the shield, a thermocouple having its junction located within the shield and between the axially spaced openings, said thermocouple including a projection on the shield of one thermocouple alloy and a wire of another thermocouple alloy connected thereto with the connection of the wire and the projection forming the thermocouple junction, and another thermocouple, of which the shield forms one element, including a wire connected to the shield to form a thermocouple junction thereon.

ELBERT MARSTON MOFFATT.

REFERENCES CITED

The following references are of record in the file of this patent:

UNITED STATES PATENTS

| Number | Name | Date |
|---|---|---|
| 1,766,148 | Sawyer | June 24, 1930 |
| 2,006,469 | Lucke | July 2, 1935 |
| 2,198,896 | Wetzel | Apr. 30, 1940 |
| 2,285,866 | Markle | June 9, 1942 |
| 2,305,585 | Alfery | Dec. 22, 1942 |
| 2,385,530 | Paille | Sept. 25, 1945 |
| 2,414,370 | Floyd | Jan. 14, 1947 |
| 2,438,575 | Ray | Mar. 30, 1948 |

FOREIGN PATENTS

| Number | Country | Date |
|---|---|---|
| 805,510 | France | Aug. 22, 1936 |

OTHER REFERENCES

Probert et al., J. Sc. Insts., vol. 23, April 1946, page 75.

Hottel et al., Trans. A. S. M. E., March 1945, page A29.